United States Patent [19]

Hofmann et al.

[11] Patent Number: 4,606,658
[45] Date of Patent: Aug. 19, 1986

[54] CAGE FOR TWO-ROW ANGULAR-CONTACT BALL BEARING

[75] Inventors: Heinrich Hofmann, Schweinfurt; Günter Markfelder, Üchtelhausen, both of Fed. Rep. of Germany

[73] Assignee: FAG Kugelfischer Georg Schafer (KGaA), Fed. Rep. of Germany

[21] Appl. No.: 798,752

[22] Filed: Nov. 15, 1985

[30] Foreign Application Priority Data

Dec. 22, 1984 [DE] Fed. Rep. of Germany ....... 3447148

[51] Int. Cl.$^4$ .............................................. F16C 19/08
[52] U.S. Cl. .................................... 384/510; 384/458; 384/512; 384/517; 384/526
[58] Field of Search ............... 384/510, 512, 458, 517, 384/526, 563

[56] References Cited

U.S. PATENT DOCUMENTS

| | | | |
|---|---|---|---|
| 3,125,383 | 3/1964 | Stahlecker et al. | 384/512 |
| 3,738,719 | 6/1973 | Langner | 384/517 |
| 4,173,376 | 11/1979 | Standing et al. | 384/517 |
| 4,523,864 | 6/1985 | Walter et al. | 384/517 |

Primary Examiner—Lenard A. Footland
Attorney, Agent, or Firm—Ostrolenk, Faber, Gerb & Soffen

[57] ABSTRACT

The disclosure concerns a two-row angular-contact ball bearing with axially spaced apart inner races defined on a shaft and outer rings with outer races disposed around the inner races. The outer rings are held apart by a bushing, and a spring inside the bushing presses one outer ring away from the other. At each outer ring is a respective cage for the bearing balls and the cage has a T-shaped cross section with the leg of the T being the prongs between adjacent balls and the cross bar of the T resting on one radial side on a collar defined on the shaft and at the other radial side which is radially outwardly of the collar, on the end of the respective outer ring, and with the cage resting there, the balls are in the inner race. The cage includes elements surrounding the balls and defining pockets and at least some of the sections of the pockets are resilient to expand as the balls are moved over the shaft toward the race and to return to shape after the balls have entered the inner race.

8 Claims, 3 Drawing Figures

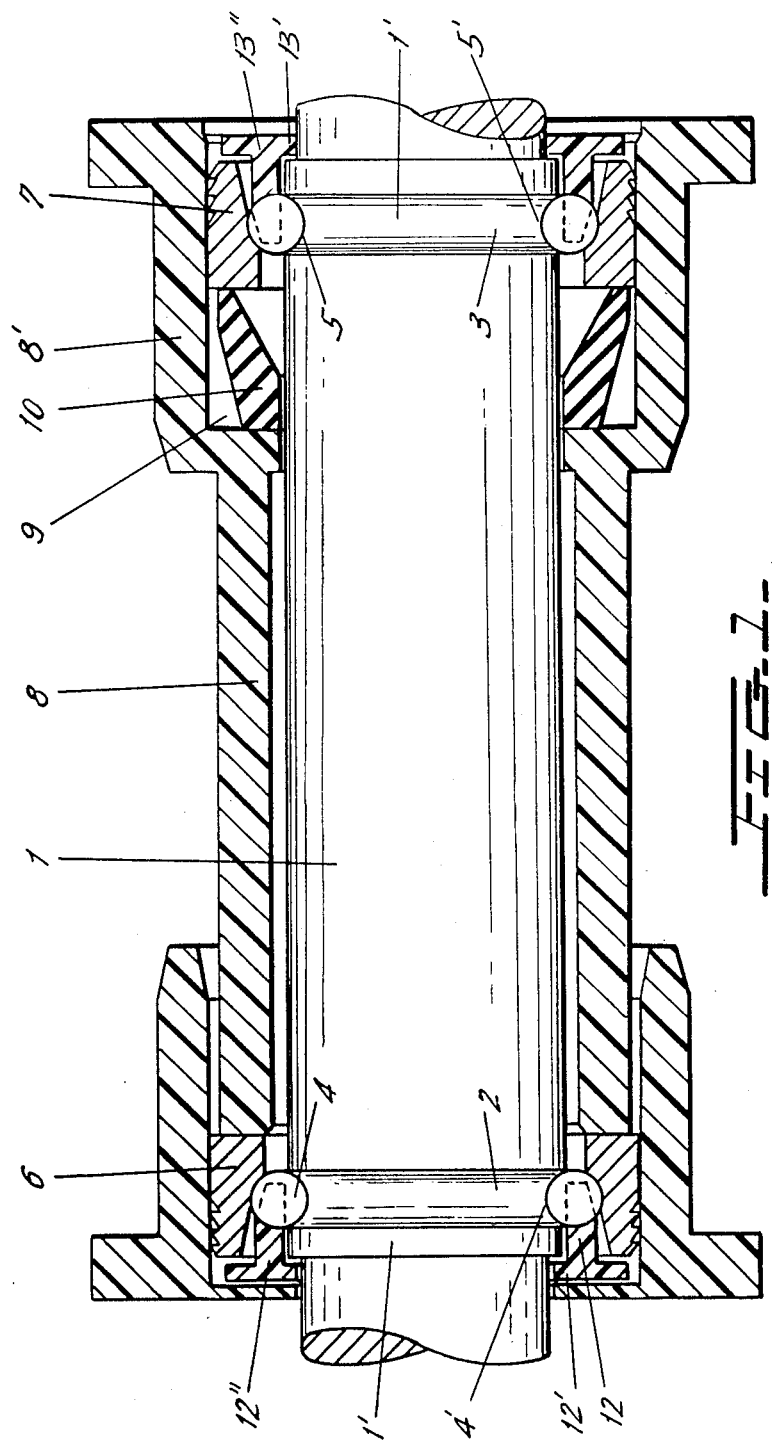

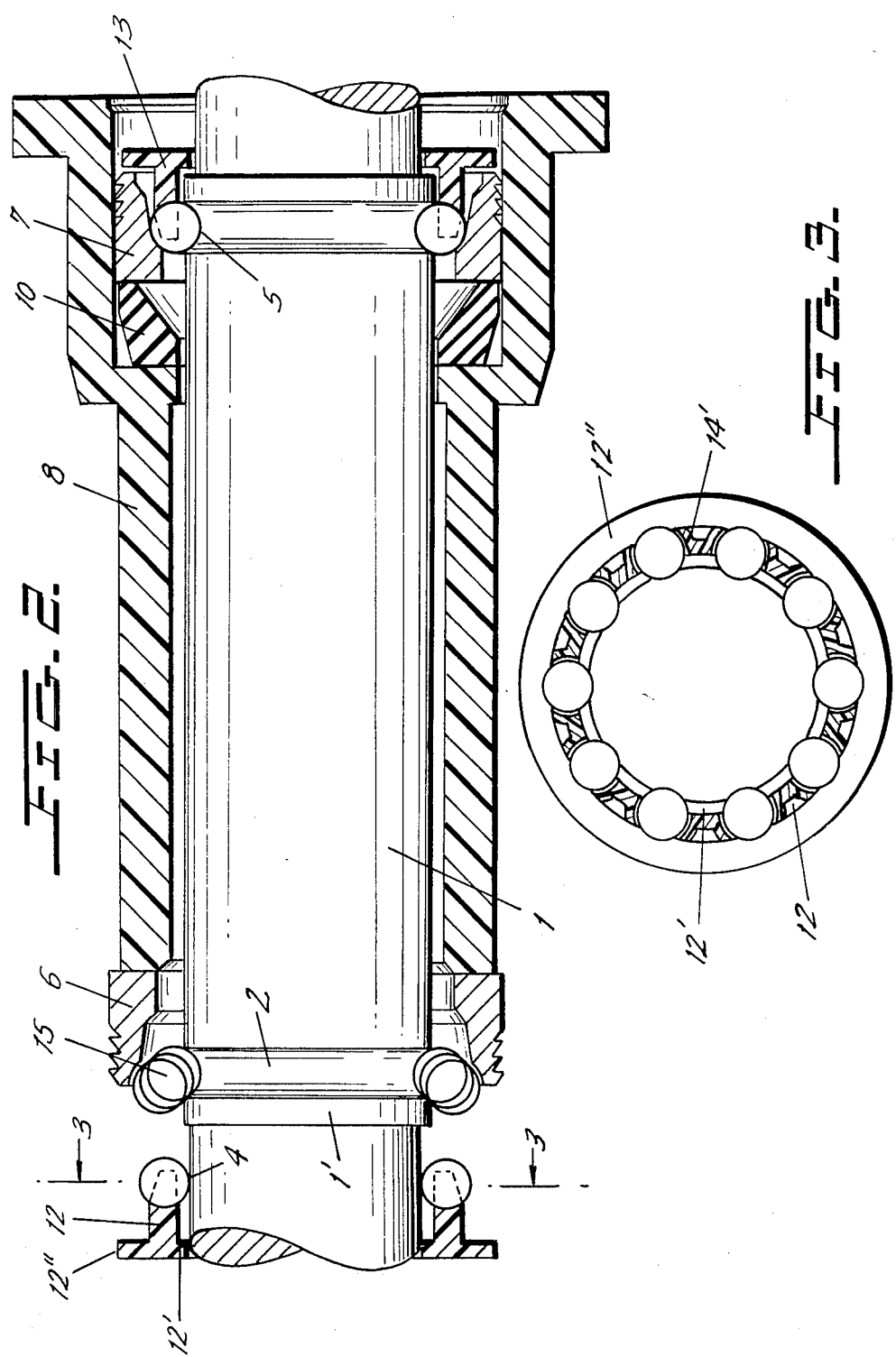

CAGE FOR TWO-ROW ANGULAR-CONTACT BALL BEARING

BACKGROUND OF THE INVENTION

The present invention refers to a two-row angular-contact ball bearing and particularly to a cage for each of the rows.

Bearings of this type are already known from Federal Republic of Germany Application DE-OS 32 31 138. In particular, the mounting of the last one of the two bearings is difficult even if, as shown in FIG. 4 of that Application, the outer ring can be shifted axially while the balls for that ring and the cage are being introduced. A so-called window or pocket cage is used there. Even if the cage has holding projections which prevent the balls from falling out upon mounting, the introduction of the balls is still difficult. They must be introduced under spring action into the cage pockets when the cage is positioned in the region of the race. This individual introduction of the balls is, however, time-consuming and expensive.

An obvious solution to the foregoing is to provide the cage with balls before the cage with its balls held in place are together applied to the shaft. In that case, however, the holding lugs must be arranged so that they permit the balls to move away radially onto a larger pitch circle which enables the balls to be fitted over the shaft and into the inner race on the shaft. Among other problems, upon the pushing back of the outer ring the balls can strike against sharp edges here and be damaged. If this occurs, then rapid failure of the bearing must be expected.

SUMMARY OF THE INVENTION

The object of the present invention is to enable simple and reliable mounting of the balls and cage in a two-row bearing, particularly for the row of the bearing balls which is mounted last, and in which the danger of damage to the balls is dependably avoided.

The present invention relates to a two-row angular-contact bearing supported on a shaft, such as the shaft of the pedal of a bicycle. Two races are defined in the shaft at axially spaced apart locations along the shaft. To define each of the bearings, there is a respective first and second outer ring each having a respective outer race disposed around the inner races on the/shaft. Rolling members in the form of balls are guided between the inner and outer races. A bushing located around the shaft extends between the first and second outer rings for holding the outer rings apart. Preferably, there is a spring between one of the outer rings and the bushing, so that the position of one of the outer rings can be adjusted with respect to the other during the mounting of the bearing elements.

There is a respective cage for each of the sets of rolling elements at each of the outer rings. At least one of the cages and more typically both is shaped for engaging the rolling members both radially and axially. At least one cage and preferably both has an element particularly one or more of the size of the pocket for the rolling elements, which is resiliently expansible so as to accommodate such enlargement of the cage with the balls in it to enable insulation of the cage with the balls installed in it over the shaft and to enable movement thereof toward the inner race defined in the shaft.

At least one of the cages preferably has a T-shaped cross section, and the prongs of the cage that define the pockets are the leg of the T. The cross bar of the T extends to be in contact with one or both of the axially outward surface of the respective outer ring and/or against a collar defined on the shaft, which collar is so placed that when the cross bar of the T rests against the collar, the cage is in position to cause the balls to be in the inner race.

Because the balls are securely gripped radially and axially even when a comb-type or prong cage is used, a dependable structural unit consisting of the cage and balls already exists in unmounted condition. If this unit is now pushed over the shaft, then the balls can be arranged on a larger pitch circle due to the resiliency of the resilient pocket sections. When the cage with pre-mounted balls comes axially of the shaft into the region of the inner race, the T-shaped cage comes against the shaft collar and/or the outer ring. This fixes the cage axially. The balls can thereafter not be introduced axially so far that they strike against the inner edge of the inner race of the shaft. Due to the resilience of the pocket sections, the balls are pressed approximately centrally into the race, whereby damage is avoided. Damage also does not occur upon the return motion of the outer ring, since the balls are already held in the inner race of the shaft by the cage.

The T-shaped cage also provides a sealing effect since, in the installed condition, its arms rest with slight clearance against the outer ring and a collar on the shaft.

If the arms of the T-shaped cage extend radially respectively as far as the shaft and as far as the outer surface of the outer ring, the labyrinth gaps are particularly long. Furthermore, in this way, rusting of the faces of the outer ring, which is also esthetically displeasing, is avoided, since the gaps between the cages and their outer rings become filled with lubricant.

BRIEF DESCRIPTION OF THE DRAWINGS

Other objects and features of the invention are explained with reference to the accompanying drawings:

FIG. 1 is a longitudinal section through a two-row bearing in accordance with the invention;

FIG. 2 is a fragmentary view showing the bearing of FIG. 1 during the mounting of the final row;

FIG. 3 shows a cage along the section line I—I in FIG. 2.

DESCRIPTION OF THE PREFERRED EMBODIMENT

FIG. 1 shows a two-row angular-contact ball bearing in O-arrangement. It can be used, for instance, for the pedal bearings of bicycles, although the bearing is not limited to any particular application. The inner races 2 and 3 for the two rows of balls 4 and 5 are arranged in the shaft 1 at axially spaced locations. The two rows of bearing balls are turnably supported in the races of the respective outer rings 6 and 7. Axially between the outer rings 6 and 7, a bushing 8 is provided. The radially enlarged end part 8' of the bushing 8 radially surrounds the one outer ring 7. With a residual axial space 9 between the shoulder at the inner axial end of the bushing end section 8' and the outer ring 7, an annular, contact body, outwardly biasing spring 10 is positioned. Upon the mounting of the rows of balls 6 and 7, either the one outer ring 6 or the other outer ring 7 can be shifted axially due to yielding of the spring 10. In order to facilitate installation of the entire bearing into a housing (not shown), an intermediate sleeve 11, which surrounds the outer ring 6, is also provided on the other side of the bearing.

The comb or prong cages 12 and 13 for the bearing rings 6 and 5, respectively, are of T-shaped cross-sectional profile, as seen in cross section. Before their mounting both cages are filled with balls 4'. The respective cross bar arms 12' and 13' of the cages 12 and 13 face shaft collars 1' of the cages 12 and 13 and thus seal the bearing off in the region of the shaft. The radially inward arm 12' furthermore fixes the axial position of the cage 3 upon mounting of the cage. The dimensions are selected so that upon application of the inward arm 12' against the collar 1', the balls are positioned axially within the region of the race 2. In this way, further dropping the row of balls 4 along with cage 12 into the inside of the bearing, which would make mounting of the cage and balls difficult or even impossible, is avoided. The radially outer arms 12" and 13" of the cross bars of the cages seal off the faces of the outer rings 6 and 7.

As shown in FIG. 3, the cages 12 and 13 also have pockets 14 in which respective resilient sections 14' are provided. The resilient sections permit positioning of the balls 4' on a larger pitch circle when the rows of balls 4 and 5 are initially brought over the shaft section 1', whose diameter is greater than the diameter of the races inner 2 and 3. After the outer rings 6 and 7 have been pushed away, when the balls 4' have come into the regions of the races inner 2 and 3, the resilience of the pocket sections 14" help to push the balls into their correct positions. The shoulder-free or lipless outer rings 6 or 7 can then be pushed back axially again in simple fashion. In this manner, the correct end position of all parts as a structural unit are obtained, and this is shown in FIG. 1.

Since the invention concerns a bearing in O-arrangement, the steps stated above can be carried out only in sequence. Additional problems occur in the case of the last mounted bearing 6 because of the bushing 8. The bushing 8 would prevent axial displacement of the outer rings 6 and 7 toward each other if that bushing were to completely fill up the space between the faces of the outer rings 6 and 7. To avoid this problem, the bushing 8 is stepped at a shoulder, defining a remaining free space 9 in which a spring 10 in the form of a generally conically shaped, resilient material contact body, which is initially prestressed axially, is located. With this construction, the last row of balls 4 is now mounted, in the following manner, as also shown in a particular stage of mounting in FIG. 2. After the mounting of the row of balls 5 in the customary manner, the outer ring 7, the cage 13, the bushing 8 and the spring 10 on the shaft 1, the bushing 8 is pushed axially toward the outer ring 7, which deforms the spring 10. In this way, it is possible to also push the outer ring 6 so far that the cage 12, which had been provided with the balls 4' can be brought over the radially widened collar 1', as described above. The balls 4' are then pushed back again into the correct size pitch circle in the region of the race 2 by the resilient sections 14', as shown at the position 15 in FIG. 2. The spring 10 then pushes the bushing 8 and the outer ring 6 back into their end position shown in FIG. 1. In order to obtain a symmetrical positioning, which facilitates the further mounting of the bearing into the housing (not shown), the intermediate sleeve 11 is then placed over the outer ring 6.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A two-row angular-contact bearing on a shaft, comprising:
  a first and a second inner race being defined in and around the shaft at axially spaced locations along the shaft; a first and a second outer ring disposed around and having respective first and second outer races around the respective first and second inner races; bearing rolling members rollingly supported between each inner race and the respective outer race;
  a bushing around the shaft and extending between the first and second outer rings and holding the outer rings apart; between one of the outer rings and the bushing, an axial spring is disposed for biasing the one outer ring away from the other outer ring;
  a respective cage for the bearing rolling members at each of the outer rings; at least one of the cages being shaped for engaging the rolling members supported thereby both radially and axially, and the cage including elements thereof which define respective pockets each for a respective rolling member; each pocket of the one cage including a resilient expansible element and the rolling members being in engagement with the expansible element of the respective pocket; the resilient expansible pocket element being so disposed that stretching thereof causes the diameter of the respective ring of rolling members to become larger, and the ring of rolling members being expansible to an extent such that the encircling envelope around the shaft defined by the rolling members outside the respective inner race is at least equal to the diameter of the shaft axially outside the inner race, for enabling the balls to be moved over, the shaft and into the inner race.

2. The bearing of claim 1, wherein at least the one cage has a T-shaped cross section, where the cage has prongs that extend into the spaces between adjacent rolling members and those prongs define the leg of the T and the cage has a cross bar that defines the cross bar of the T; a collar on the shaft in the vicinity of the one inner race; the collar being so placed and the cage being so shaped that the cross bar of the comes axially against the collar on the shaft when the rolling members have been moved into the region of the inner race.

3. The bearing of claim 2, wherein the cross bar of the T is also moved axially against the outer ring when the rolling members have moved axially into the region of the inner race.

4. The bearing of claim 1, wherein at least the one cage has a T-shaped cross section, where the cage has prongs that extend into the spaces between adjacent rolling members and those prongs define the leg of the T and the cage has a cross bar that defines the cross bar of the T; the cross bar of the T is moved axially against the outer ring when the rolling members have been moved axially into the region of the inner race.

5. The bearing of claim 1, wherein the cage has a periphery with an outside diameter which is slightly smaller than the outside diameter of the respective outer ring.

6. The bearing of claim 1, wherein the bushing includes a shoulder near to one of the outer rings and the bushing having a radially enlarged end section which extends from the shoulder and extends past and surrounds the one outer ring; the shoulder of the bushing being so placed axially with respect to the one outer ring that a free space is defined inside the enlarged end section of the bushing between the shoulder and the first outer ring; the spring for urging the one outer ring away from the other outer ring is positioned in the free space and operates against the one outer ring and the shoulder for biasing the outer rings apart.

7. The bearing of claim 1, wherein there is a respective one of the cages at each of the outer rings and its respective inner races.

8. The bearing of claim 1, wherein the rolling members are balls and the bearing is a two-row angular-contact ball bearing.

* * * * *